United States Patent
Vittor

(10) Patent No.: US 8,240,729 B2
(45) Date of Patent: Aug. 14, 2012

(54) GRIPPER FINGER, GRIPPER TOOL AND METHOD FOR ADJUSTING A GRIPPER TOOL

(75) Inventor: Timothy Vittor, Ladenburg (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 13/195,511

(22) Filed: Aug. 1, 2011

(65) Prior Publication Data
US 2012/0007375 A1 Jan. 12, 2012

Related U.S. Application Data

(63) Continuation of application No. PCT/EP2009/000650, filed on Jan. 31, 2009.

(51) Int. Cl.
*B25J 15/08* (2006.01)
(52) U.S. Cl. .......... 294/86.4; 294/213; 294/902; 901/39
(58) Field of Classification Search .................. 294/86.4, 294/196, 198, 207, 213, 219, 902; 901/31, 901/37, 39, 45; 269/266, 275; 264/322
See application file for complete search history.

(56) References Cited

U.S. PATENT DOCUMENTS

| | | | | |
|---|---|---|---|---|
| 3,675,962 A | * | 7/1972 | Simpson | 294/99.1 |
| 4,715,637 A | * | 12/1987 | Hosoda et al. | 294/86.4 |
| 4,752,063 A | * | 6/1988 | Nagy | 269/266 |
| 5,722,709 A | * | 3/1998 | Lortz et al. | 294/86.4 |
| 5,810,881 A | * | 9/1998 | Hoskin et al. | 606/207 |
| 2008/0272259 A1 | * | 11/2008 | Zavattieri et al. | 248/311.2 |
| 2008/0289757 A1 | * | 11/2008 | Xie et al. | 156/311 |

FOREIGN PATENT DOCUMENTS

| | | |
|---|---|---|
| DE | 44 06 771 A1 | 9/1995 |
| JP | 4-300189 A | 10/1992 |
| JP | 2000-263488 A | 9/2000 |

OTHER PUBLICATIONS

International Search Report (PCT/ISA/210) issued on Oct. 6, 2009, by European Patent Office as the International Searching Authority for International Application No. PCT/EP2009/000650.

* cited by examiner

*Primary Examiner* — Dean Kramer
(74) *Attorney, Agent, or Firm* — Buchanan Ingersoll & Rooney PC

(57) ABSTRACT

The disclosure relates to a gripper finger including a surface area for clamping. This area this area is covered with a membrane including at least one section, which is substantially made of a shape memory polymer (SMP). The disclosure relates also to a gripper tool including such gripper finger and a method for adjusting such a gripper tool.

21 Claims, 3 Drawing Sheets

A

B

C

D

E

F

GRIPPER FINGER, GRIPPER TOOL AND METHOD FOR ADJUSTING A GRIPPER TOOL

RELATED APPLICATION

This application claims priority as a continuation application under 35 U.S.C. §120 to PCT/EP2009/000650 filed as an International Application on Jan. 31, 2009 designating the U.S., the entire content of which is hereby incorporated by reference.

FIELD

The disclosure relates to a gripper finger including a surface area for clamping, a gripper tool with at least one such gripper finger and a method for adjusting the gripper tool.

BACKGROUND INFORMATION

It is known that in industrial production processes, parts, such as workpieces, components or modules, are often assembled to a final product or unit. Examples include mounting of electrical components on a board and the assembly of a car body. Such assembly processes can be done automatically by machines including a gripper tool for grasping a part, for example, from a conveyor or a supply box and moving it into a desired position in relation to another part for mounting them together. Several machines can be involved in such an assembly process and some of the production steps can be done manually.

A gripper tool can include at least one gripper finger, which can be moved towards at least one other gripper finger or, for example, a wall or wrist of the gripper tool, so that a part or workpiece to be gripped can be clamped in between a variable gap formed, for example, by two gripper fingers. The shape of a gripper finger can depend on a size and shape of the object to be gripped. A gripper finger might be shaped similar to a human finger, for example, a simple rod with a length from a few cm to 50 cm and more, whereas the parts to be gripped can be clamped at the end of such a gripper finger. The shape of a gripper finger can be linear but also can include one or more individual bends to optimize it for the individual frame conditions, for example, the average size of the workpieces to be gripped.

A gripper finger or tool can be optimized for a special shape of a large object, such as a door of a car. In this case, the gripper finger might be suitable only for the gripping of this one special shape.

In production lines for smaller units, such as an assembly line for electrical components, a wide range of different shaped parts have to be gripped. For example resistors, integrated circuits, different shaped capacitors and others. To assure a correct assembly process, it can be required to have such parts in an exact defined position when clamped between, for example, two gripper fingers.

Therefore, a cast-like fixture can be provided at the surface area of a gripper finger, which is foreseen for clamping. So the object which is gripped, for example out of a supply box, is in an exact position without any larger tolerance when clamped in between the cast fixtures at the surface areas of the gripper fingers.

Such a gripper finger with a casted surface area for clamping may be suitable only for a limited range of shapes of workpieces to be gripped, in a worst case only for one shape. Therefore, different gripper fingers or gripper tools are used for different types of workpieces to be gripped. It can involve additional effort to provide several gripper fingers for respective gripper tools. It can involve additional time in the production process to change a gripper finger for a respective gripper tool to adapt the machine for the shape of another workpiece to be gripped.

SUMMARY

A gripper finger is disclosed, including a membrane including at least one section, which is predominantly made of a shape memory polymer (SMP) and a surface area for clamping covered by the membrane.

A gripper tool is disclosed having at least one gripper finger and including a frame; a membrane including at least one section which is predominantly made of a shape memory polymer (SMP) and a surface area for clamping covered by the membrane.

A method is disclosed for adjusting a gripper tool before first-time gripping of a workpiece, wherein the gripper tool includes a surface area for clamping covered by a membrane having at least one section which is predominantly made of a shape memory polymer (SMP), the method comprising: heating at least a part of the membrane to a recovery temperature so that at least the heated part of the membrane returns to an initial shape, changing the temperature of at least a part of the membrane temporarily to an imprint temperature; moving an object with a shape of the workpiece to be gripped against the heated membrane so that a cast of at least a part of the object is generated in the membrane; cooling the membrane to a curing temperature while the object remains in a same relative position to the membrane; and generating a durable cast of the object in the membrane.

BRIEF DESCRIPTION OF THE DRAWINGS

The disclosure will now be further explained by exemplary embodiments and with reference to the accompanying drawings, in which.

DETAILED DESCRIPTION

Figure 1:
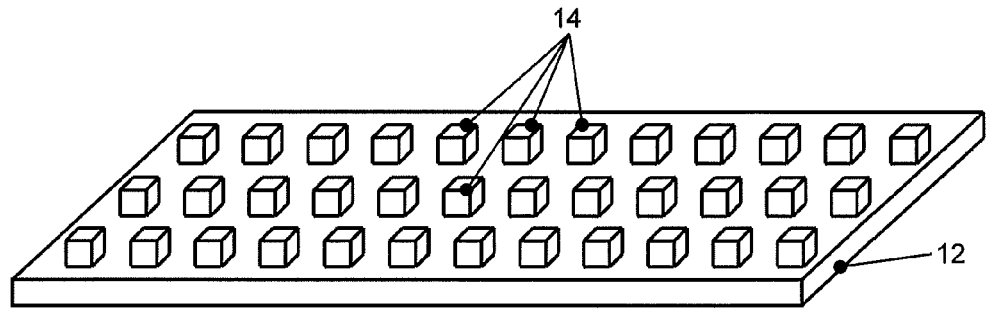
FIG. 1 shows an exemplary embodiment of a first membrane in a 3D view.

A gripper finger is disclosed with flexibility concerning the shape of the workpieces to be gripped.

The gripper finger includes a surface area for clamping. This area is covered with a membrane including at least one section which can, for example, be predominantly made of a shape memory polymer (SMP).

Shape memory polymers are materials which can be formed into a desired shape when heated to an imprint temperature. In the heated stage, shape memory polymers can have a flexible structure which can be modified, for example, by pressing an object with a solid structure there in, so that a cast of the object is generated within the shape memory polymer. After cooling down the shape memory polymer to a curing temperature, it can return to the solid state and can remain in the desired shape.

When heating a shape memory polymer to a recovery temperature, it returns to an initial shape while having a flexible structure. The imprint temperature and the recovery temperature can be similar or the same, so that a shape memory polymer directly can be formed into the desired shape after returning to its initial shape. This temperature is also called the glass transition temperature.

An exemplary shape memory polymer is for example 'Verifex Shape Memory Polymer Resin' from CRG Industries, which has a glass transition temperature of around 62° C. The thickness of the membrane could be, for example, 1 mm, 10 mm or more, dependent on the size and kind of workpieces to be gripped.

A membrane covering the surface area for clamping of the gripper finger can contain at least sections, which are made at least predominantly out of such a shape memory polymer. Other sections can be made, for example, out of other materials which remain solid when heated to the glass transition temperature of the shape memory polymer. Those materials give the whole membrane rigidity, even when heated. In addition the required amount of shape memory polymer can be reduced by this. An example for a membrane could be a mesh of a metal which is covered by or connected with one or more a layers of shape memory polymer. But it is, of course, also possible to have a membrane including only a shape memory polymer.

Using such a membrane to cover the surface area of the gripper finger for clamping the shape of the surface area can be adapted to the shape of the objects to be gripped by making a cast of at least a part of the object within the membrane.

In an exemplary embodiment of the disclosure, the membrane includes internal hollows. Those internal hollows can either be bubble-like embeddings due to a porous like structure of the membrane or geometrical hollow spaces such as cuboids or spheres which are bounded on all sides by planes of the membrane.

Such internal hollows can be filled with air or another gas and can enable a compression of the membrane when imprinting a cast without swelling of the membrane on another outer edge. The handling of the membrane and the connection to the gripper finger can become improved by this because the side of the membrane facing to the gripper finger is not changing, when a cast is imprinted.

In an exemplary embodiment of the disclosure, at least one side of the membrane includes the shapes of several distance elements so that external cavities can be formed in between those distance elements.

A distance element can have the shape of a burl, a cube or a bar for example. A distance element can be made of a shape memory polymer but also of other materials. In an exemplary embodiment, those distance elements can have the same height. A top view on a membrane including such distance elements can be similar to a top view of a labyrinth. A purpose of those external cavities is similar to the purpose of the internal hollows mentioned before.

In an exemplary embodiment of the membrane, a truss structure can be formed by at least some of the distance elements. A truss structure can be, for example, a kind of grid but also a bar shape along a section of the membrane. Such a structure can give the whole membrane certain rigidity, even when heated.

In an exemplary embodiment, the membrane can enclose a cross-section of the gripper finger in an angle of at least 90°. The gripper finger can be enclosed by the membrane, for example, in a U-like form in an angle of 180° or it can be totally enclosed in an angle of 360°. The effort for attaching of the membrane to the gripper finger can be reduced in an advantageous manner by this.

The effort for attaching the membrane to the gripper finger can also be reducible in that the membrane includes a moulding shape, so that, for example, the cross section of the membrane has the shape of a T or I, which is fitting to a belonging counterpart shape of the gripper finger.

In an exemplary embodiment of the disclosure, the membrane includes some block outs for connecting it with corresponding nozzle elements of the gripper finger so that the membrane can be fixable to the gripper finger.

In an exemplary embodiment of the disclosure, at least one heating device can be arranged in-between the membrane and the gripper finger. The heating device can heat the membrane or parts of the membrane to the glass transition temperature or higher, so that it is possible to initiate the return of the shape memory polymer to its initial shape before generating a new cast within the membrane. The heating device can be a flat and electrically heated element for example. This can have the advantage that the membrane is heated homogenously in a short time, such as a few seconds. The electrical power of such a heating device can be, for example, some few Watts for a very small membrane and up to a 100 Watts and more for bigger ones The heating process can be improved by filling at least one of the internal hollows and/or external cavities with a compressible and heat conductible material. This material can increase the heat transfer from the heating device to all areas of the membrane and can reduce the time for the heating process. A suitable material is, for example, the material "Gap Pad VO Ultra Soft" from the Bergquist Company or "Thermal Gap Pads" from Dow Corning. Of course, other materials are suitable as well for this purpose, including also fluids.

In an exemplary embodiment of the disclosure, at least one section of the gripper finger which is not covered by the membrane, predominantly, (e.g., >50%) includes a shape memory polymer (SMP). The gripper finger can have an elongate structure, for example, 20 cm. Making a section of this gripper finger, for example in between 5 cm and 10 cm of its length, out of a shape memory polymer, it can be possible to generate a variable bending within this section. The bending process can be comparable to the adaptation of the membrane as described before. Heating of the section with the shape memory polymer, automatic return to its initial shape, bringing it to the desired shape and cooling down. In a desirable way, the flexibility of the gripper finger can once more be increased.

In an exemplary embodiment, a gripper tool can include at least a frame and one gripper finger according to the disclosure. At least one gripper finger of the gripper tool can be moveable by at least one actuator against another gripper finger of the gripper tool. A wide range of different shaped workpieces or objects to be gripped can be easily clamped in between the gripper fingers.

Due to the use of the gripper finger, according to exemplary embodiments of the disclosure, the gripper tool can be extremely flexible concerning the shape of the objects to be gripped. Of course, gripper tools with a larger number of gripper fingers, for example 6, are possible. It is also possible, that each gripper finger can be moveable by a dedicated actuator.

In a exemplary embodiment of the disclosure the gripper tool can be mounted on a robot. A robot is a manipulator with, for example, six or seven degrees of freedom in movement and an operational radius of—dependent of the type of robot—for example 0.5 m to 4 m. A robot can be suitable to move the gripper tool in a very flexible way and in different orientations within its working range, so that the combination of gripper tool according to the disclosure and robot can result in a flexible system which can be used as part of an industrial production line, for example, for purposes of mounting a wide range of differently shaped parts together.

In a variant of the disclosure the at least one actuator can be controlled by a robot controller, which can also control the movement of the belonging robot. So the effort for control equipment for such flexible system can be reduced significantly and the coordination of robot movement and gripping movement can be improved.

In a method for adjusting a gripper tool in an exemplary embodiment of the disclosure, before the first-time gripping of a definite type of workpiece, a gripper tool according to the disclosure is used. At least a part of the membrane can be heated up to a recovery temperature so that at least the heated part of the membrane returns to an initial shape. The temperature of at least a part of the membrane temporarily becomes changed to an imprint temperature. An object with the shape of the workpiece to be gripped can be moved against the heated membrane so that a cast of at least a part of the object can be generated in the membrane. The membrane can be cooled down to a curing temperature while the object remains in the same relative position to the membrane, and a durable cast of the object can be generated in the membrane.

The recovery temperature and the imprint temperature can be the same and corresponding to the glass transition temperature of the shape memory polymer. It is possible to heat only a part of the membrane. Dependent on the membrane and the heating device this process can take, for example, about 10 s-40 s (e.g., ±10%). A cooling down of the membrane can be either based on natural cooling so that no additional effort for cooling is done except, that the environmental temperature can be lower than the temperature of the heated membrane. It is also possible to foresee a special cooling device. This has the advantage that the speed of the entire process of adjusting the gripper tool can be increased.

In an exemplary embodiment of the disclosure the membrane can be heated by an external heating device, which is not attached to the gripper tool. If a gripper tool according to the disclosure is mounted on a robot, for example, the robot could move the gripper tool in an oven within its working range. The oven could be a standard heating oven but it is also possible that the membrane includes some metal flake or other particles, for example, which can be brought into a resonance frequency by an external device, so that the membrane is heated by this.

According to another exemplary embodiment of the disclosure at least two casts of objects with the shape of different types of workpieces to be gripped are generated in the membrane at the same time so that after cooling down of the membrane the belonging types of workpieces can be gripped without re-adjusting the gripper tool. The number of specified re-adjusting processes can be reduced in this way.

A workpiece of the type to be gripped itself can be used as an object to generate the cast in the membrane.

In another exemplary embodiment of the disclosure, a section of a gripper finger, which predominantly includes a shape memory polymer and which is not covered by the membrane, can be heated up to a modification temperature. The shape of the section can be adjusted before the first-time gripping of a definite type of workpiece and the section can be cooled down to a curing temperature while remaining in the adjusted position so that the working range of the gripper finger can be adjusted.

The movement range of the gripper finger, for example +/−2 cm, can be limited to the movement range of the actuator which drives this finger. By adjusting the gripper finger itself it can become possible to grip larger, as well as smaller, workpieces. It is possible to have in the first adjustment stage of two gripper fingers an exemplary distance of 10 cm +/−2 cm in between them and an exemplary 4 cm +/−2 cm in a second adjustment stage. The gripping process becomes more flexible by this.

FIG. 1 shows a first membrane 10 in a 3D view. On the substantially flat base 12 of the membrane, which can be made, for example, out of a shape memory polymer such as "Verifex Shape Memory Polymer Resin" from CRG Industries, several burling like distance elements 14 can be arranged. In this example, the distance elements 14 are not attached as separate parts because the whole membrane 10 is made of a single block of shape memory polymer. But it can also be possible to attach at least some of the distance elements 14 which in addition could be made out of a different material.

In between the distance elements an external cavity is formed, which can be filled with a compressible and heat conductible material such as "Gap Pad VO Ultra Soft" from Bergquist Company or another material, which could have the shape of a matching mat for example.

The thickness of such a membrane depends on the required depth of the cast which is needed for the objects to be clamped. Considering smaller electrical parts like integrated circuits or resistors, a thickness of, for example, a few mm of the membrane can be sufficient, so that the depth of a cast accounts, for example, 1 mm. For larger parts, a higher thickness of the membrane is possible.

Figure 2:
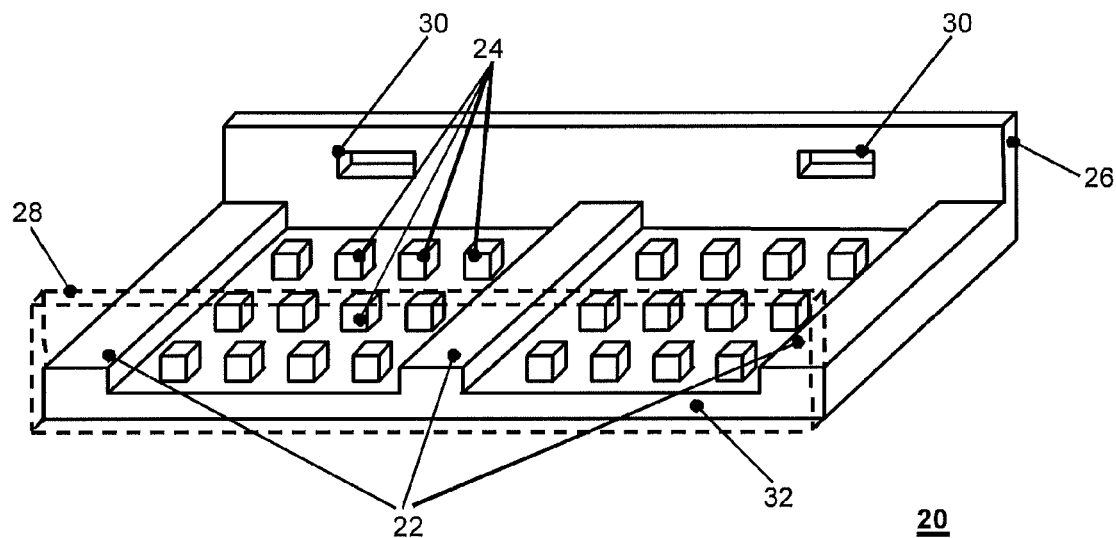
FIG. 2 shows an exemplary embodiment of a second membrane in a 3D view.

FIG. 2 shows a second membrane 20 in a 3D view. It includes a substantially flat base 32 with second burling like distance elements 24 similar to the first membrane 10. In addition, a first 26 and a second 28 side are seen, which limit the membrane 20 on opposed sides, so that a U-shape of the membrane 20 can be built. Such a membrane with a U-shape can be easy to attach on a gripper finger with, for example, a rectangular cross section. Three bar shaped distance elements 22 are seen to give the membrane 20 a more ridged structure, even when it is heated. Other truss structures are also possible, for example, a grid. An imprint of a cast into the heated base 32 of the membrane 20 can be made without losing the parallel structure of the opposed sides 26 and 28. Block outs 30 are seen to fix the membrane 20 on a gripper finger with corresponding nozzle elements.

Figure 3:
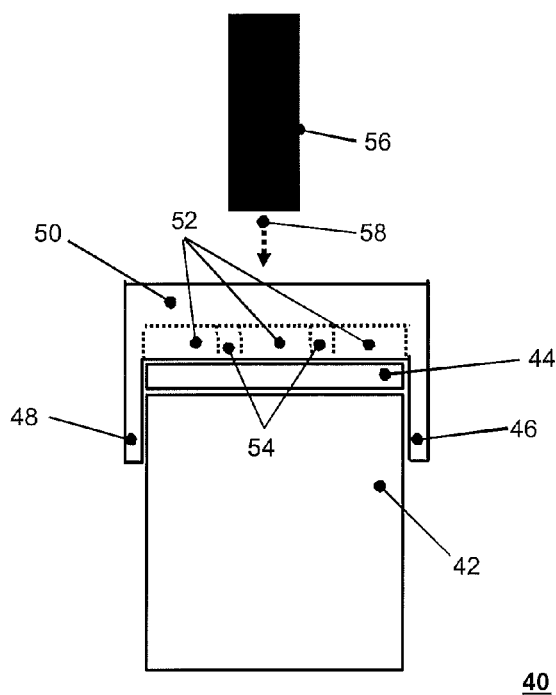
FIG. 3 shows a cross section of a gripper finger with an attached exemplary embodiment of a membrane.

FIG. 3 shows a cross section 40 of a gripper finger 42 with an attached membrane, which includes the elements first side 46, second side 48, substantially flat base 50 and third burling-like distance elements 54. All those elements can be made of the same block of shape memory polymer. Additional stabilizing elements are possible, which are not shown in this cross section 40. In between the distance elements 54 and the sides 46, 48, external cavities 52 can be formed, which can be located in between a flat heating device 44 and the flat base 50 of the membrane. Those external cavities 52 can be filled with a heat compressible heat conducting material to improve the heat transfer between heating device 44 and flat base 50 to speed up the adaptation process of the membrane. The sides 46 and 48 are not used to make an imprint of a cast, so that they are not necessarily formed of a shape memory polymer. A first workpiece 56 is shown, which is moved in the direction 58 against the flat base 50, so that there will result a cast of an imprint of the first workpiece 56 within the heated membrane.

A suitable depth of the cast of the workpiece amounts 10%-50% of the total thickness of the flat base 50 plus the thickness of the distance elements 54.

Figure 4:
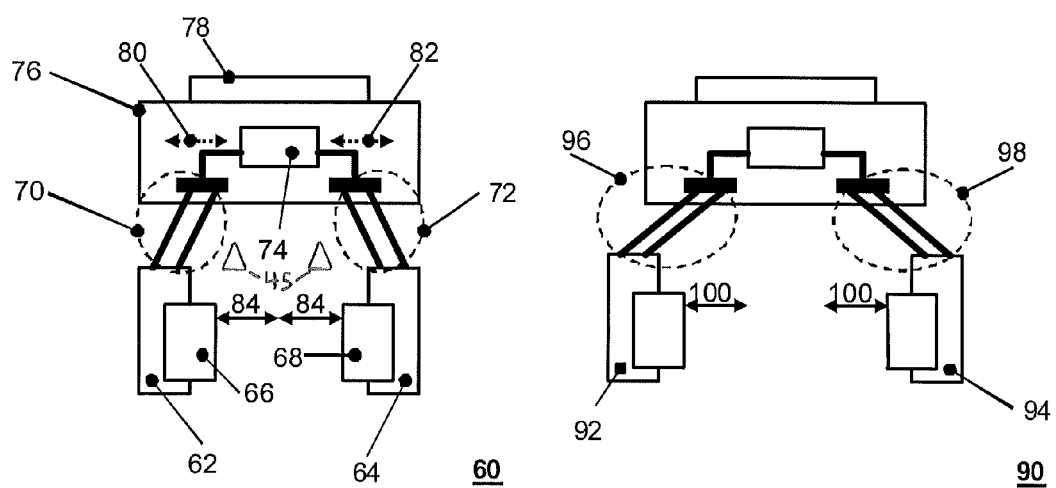
FIG. 4 shows exemplary embodiments of a first and a second gripper tool from a top-view.

FIG. 4 shows a first 60 and a second 90 gripper tool from a top-view. The first gripper tool 60 includes a first gripper finger 62 and a second gripper finger 64. The gripper fingers 62, 64 include a related section 70 respectively 72, which can be made predominately out of a shape polymer material, whereas the shape of the gripper finger is bended in the belonging sections 70 respectively 72. Those bends can be useful to define the gap in between both gripper fingers. At the end of each gripper finger 62, 64 belonging membranes 66, 68 are seen, which cover the surface areas for clamping. Each gripper finger is part of the gripper tool 60 and moveable in the directions 80 respectively 82 by the actuator 74. Because the movement range of the actuator 74 can be limited, it may not be possible to move the gripper fingers in between their maximum distance to zero, but only within a certain range 84. The gripper tool 60 also includes a frame element 76, for example, housing, and an interface 78 for connecting it with a not shown robot.

The second gripper tool 90 is similar to the first gripper tool 60 but the first 92 and second 94 gripper finger include a belonging section 96 and 98, which can also be made out of shape memory polymer but which have a different shape than the belonging sections 70 and 72 of the first gripper tool 60. This can cause a larger gap in between the first 92 and second 94 gripper finger, so that larger objects can be gripped with the second gripper tool 90 than can be gripped with the first gripper tool 60. The gap in between the gripper fingers can be adjustable within the range marked with the arrows 100.

By heating the section 70 and 72 of the first tool 60, for example, by external heater 45, bringing it into the shape of the sections 96, 98 of the second gripper tool and cooling them down, it can be possible to give the first tool 60 the same or substantially similar characteristics as the second tool 90. So a gripper finger with belonging sections 70, 72, 96, 98 made of a shape memory polymer can be very flexible concerning the size of the objects to be gripped.

Figure 5:
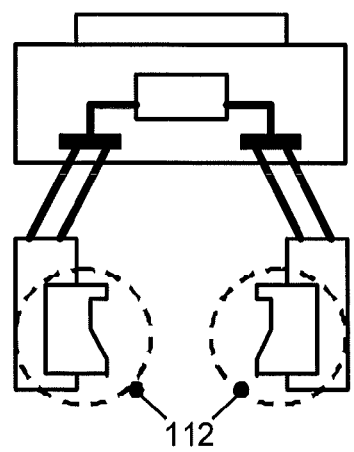
FIG. 5 shows an example of an exemplary embodiment of a method for adjusting a gripper tool.
Figure 5:
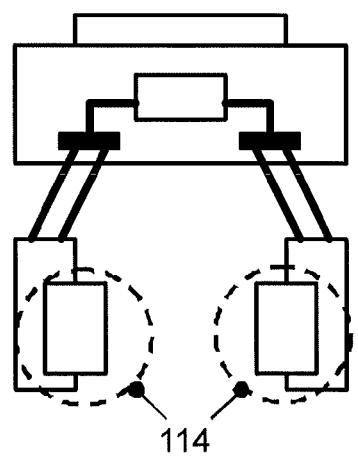
Figure 5:
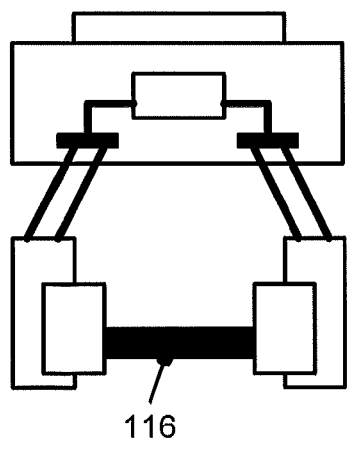
Figure 5:
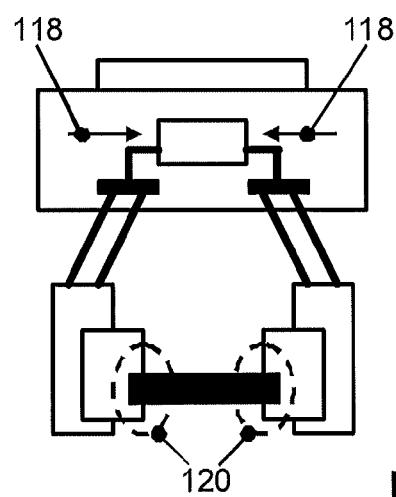
Figure 5:
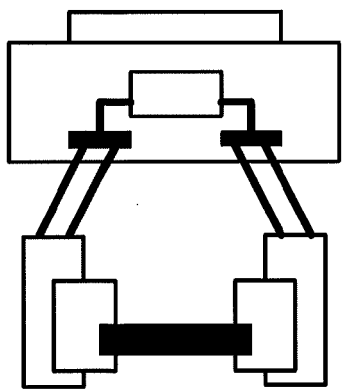
Figure 5:
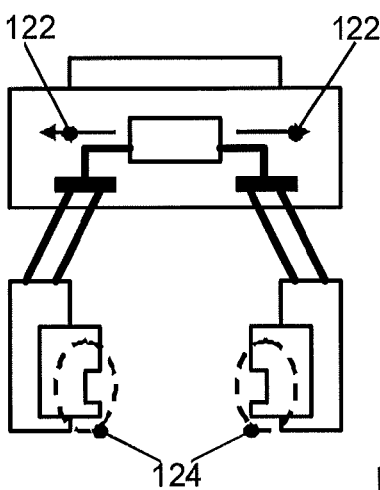

FIG. 5 shows an example of an exemplary method for adjusting a gripper tool, for example, the gripper tools 60 and 90 shown in FIG. 4.

Stage A shows the gripper tool with two membranes 112, whereas their first shapes includes the cast of a workpiece, which is not shown. In stage B, those membranes have become heated up to the glass transition temperature, for example, 70° C., and they returned to their initial shape. The membrane can now be in a flexible structure. In stage C, the gripper tool is moved over a second workpiece 116, which is now in the gap in between the membranes of the two gripper fingers. In stage D, the actuator moves both gripper fingers towards each other so that the gap becomes smaller. An imprint cast of the second workpiece 120 within the membranes is the result. In stage E, the gripper fingers and the second workpiece remain in the same position and are cooling down to a curing temperature so that the structure of the membranes becomes solid. The gripper fingers are opened in stage F and a durable imprint cast of the second workpiece has been generated within the membranes. The gripper now can be ready for the gripping process.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS 10 first membrane
12 flat base of first membrane
14 first burling-like distance elements
20 second membrane
22 bar-shaped distance element
24 second burling-like distance elements
26 first side of U-like form of first membrane
28 second side of U-like form of first membrane
30 block out
32 flat base of second membrane
40 gripper finger with attached membrane
42 gripper finger
44 heating device
46 first side of U-like form of the attached membrane
48 second side of U-like form of the attached membrane
50 flat base of the attached membrane
52 cavities
54 third burling-like distance elements
56 first workpiece
58 movement direction of first workpiece
60 first gripper tool
62 first gripper finger of first gripper tool
64 second gripper finger of first gripper tool
66 membrane attached to first gripper finger of first gripper tool
68 membrane attached to second gripper finger of first gripper tool
70 first section comprising (e.g., consisting of) shape memory polymer (SMP)
72 second section comprising (e.g., consisting of) shape memory polymer (SMP)
74 first actuator
76 frame of the first gripper tool
78 interface of first gripper tool to robot
80 movement direction of first gripper finger of first gripper tool
82 movement direction of second gripper finger of first gripper tool
84 gripper finger working range of first gripper tool
90 second gripper tool
92 first gripper finger of second gripper tool
94 second gripper finger of second gripper tool
96 first section comprising (e.g., consisting of) shape memory polymer (SMP)
98 second section comprising (e.g., consisting of) of shape memory polymer (SMP)
100 gripper finger working range of second gripper tool
110 example for the method for adjusting a gripper tool
112 membranes in first shape
114 membranes in initial shape
116 second workpiece
118 closing movement direction of gripper fingers
120 second workpiece in heated membranes
122 opening movement direction of gripper fingers
124 membrane in second shape with cast of an object
A-F different stages during the adjustment of the gripper tool

What is claimed is:
1. A gripper finger, comprising:
a membrane including at least one section which is predominantly made of a shape memory polymer (SMP) wherein at least one side of the membrane, includes a plurality of shaped distance elements so that external cavities are formed in between adjacent distance elements; and a surface area for clamping covered by the membrane.

2. The gripper finger according to claim 1 wherein the membrane comprises:
internal hollows.

3. The gripper finger according to claim 2, wherein the internal hollows are filled with a compressible and heat conductible material.

4. The gripper finger according to claim 2, wherein the internal hollows are filled with a fluid.

5. The gripper finger according to claim 1, wherein at least one truss structure is formed by at least some of the distance elements.

6. The gripper finger according to claim 1, wherein the membrane encloses a cross-section of the gripper finger in an angle of at least 90°.

7. The gripper finger according to claim 1, wherein the membrane comprises:
at least one moulding shape which is fit to a corresponding counterpart shape of the gripper finger.

8. The gripper finger according to claim 1, wherein the membrane comprises:
at least one block out for connecting the membrane with corresponding nozzle elements of the gripper finger.

9. The gripper finger according to claim 1, comprising:
at least one heating device arranged in-between the membrane and the surface area for clamping covered by the membrane.

10. The gripper finger according to claim 1, wherein at least one section of the gripper finger, which is not covered by the membrane, consists essentially of a shape memory polymer (SMP).

11. The gripper finger according to claim 1, wherein the external cavities are filled with a compressible and heat conductible material.

12. The gripper finger according to claim 1, wherein the external cavities are filled with a fluid.

13. A gripper tool comprising:
at least one gripper finger, including:
a frame;
a membrane including at least one section which is predominantly made of a shape memory polymer (SMP) wherein at least one side of the membrane includes a plurality of shaped distance elements so that external cavities are formed in between adjacent distance elements; and
a surface area for clamping covered by the membrane.

14. The gripper tool according to claim 13, comprising:
at least one actuator for moving the gripper finger against another gripper finger of the gripper tool.

15. The gripper tool according to claim 14, wherein the gripper tool is mounted on a robot.

16. The gripper tool according to claim 15, comprising:
at least one actuator controlled by a robot controller, which also controls a movement of the robot.

17. A method for adjusting a gripper tool before first-time gripping of a workpiece, wherein the gripper tool includes a surface area for clamping covered by a membrane having at least one section which is predominantly made of a shape memory polymer (SMP) wherein at least one side of the membrane includes a plurality of shaped distance elements so that external cavities are formed in between adjacent distance elements, the method comprising:
heating at least a part of the membrane to a recovery temperature so that at least the heated part of the membrane returns to an initial shape;
changing the temperature of at least a part of the membrane temporarily to an imprint temperature;
moving an object with a shape of the workpiece to be gripped against the heated membrane so that a cast of at least a part of the object is generated in the membrane;
cooling the membrane to a curing temperature while the object remains in a same relative position to the membrane; and
generating a durable cast of the object in the membrane.

18. The method according to claim 17, wherein the membrane is heated by an external heating device, which is not attached to the gripper tool.

19. The method according to claim 17, comprising:
generating at least two casts of objects with shapes of different types of workpieces to be gripped in the membrane at the same time so that after cooling of the membrane, the workpieces can be gripped without re-adjusting the gripper tool.

20. The method according to claim 17, wherein a workpiece of a type to be gripped itself is used as the object to generate the cast in the membrane.

21. The method according to claim 17, comprising:
heating a section of a gripper finger which consists essentially of a shape memory polymer and which is not covered by the membrane, to a modification temperature;
adjusting the shape of the section before a first-time gripping of a type of workpiece; and
cooling the section down to a curing temperature while remaining in the adjusted position, so that a working range of the gripper finger is adjusted.

* * * * *